US009732815B2

(12) United States Patent
Goncalves

(10) Patent No.: US 9,732,815 B2
(45) Date of Patent: Aug. 15, 2017

(54) BRAKE STROKE LOGGING INDICATOR

(71) Applicant: SPECTRA PRODUCTS INC., Toronto (CA)

(72) Inventor: Jorge M. Goncalves, Simcoe (CA)

(73) Assignee: Spectra Products Inc., Toronto (CA)

( * ) Notice: Subject to any disclaimer, the term of this patent is extended or adjusted under 35 U.S.C. 154(b) by 0 days.

(21) Appl. No.: 14/883,850

(22) Filed: Oct. 15, 2015

(65) Prior Publication Data
US 2016/0186828 A1   Jun. 30, 2016

Related U.S. Application Data

(60) Provisional application No. 62/064,387, filed on Oct. 15, 2014.

(51) Int. Cl.
*F16D 66/02* (2006.01)
*B60T 17/22* (2006.01)

(52) U.S. Cl.
CPC ......... *F16D 66/028* (2013.01); *B60T 17/228* (2013.01); *F16D 66/02* (2013.01); *B60T 17/22* (2013.01); *B60T 17/221* (2013.01)

(58) Field of Classification Search
CPC .... F16D 66/00; F16D 66/02; F16D 2066/003; F16D 17/22; F16D 17/221; F16D 17/228; B60T 17/22; B60T 17/221; B60T 17/228
See application file for complete search history.

(56) References Cited

U.S. PATENT DOCUMENTS

| 1,418,210 | A | * | 5/1922 | Souther | F16D 66/02 |
| | | | | | 116/283 |
| 4,279,214 | A | | 7/1981 | Thorn | |
| 4,776,438 | A | | 10/1988 | Schandelmeier | |
| 4,879,964 | A | | 11/1989 | Emerson, Jr. | |
| 5,244,061 | A | | 9/1993 | Hoyt et al. | |
| 5,320,198 | A | | 6/1994 | Hoyt et al. | |
| 5,441,128 | A | | 8/1995 | Hoyt | |
| 5,699,880 | A | * | 12/1997 | Hockley | F16D 66/00 |
| | | | | | 116/208 |
| 5,913,385 | A | | 6/1999 | Thibodeau | |
| 6,135,242 | A | * | 10/2000 | Hockley | F16D 66/00 |
| | | | | | 188/1.11 R |
| 7,104,365 | B1 | * | 9/2006 | Murphy | F16D 66/028 |
| | | | | | 188/1.11 W |

(Continued)

*Primary Examiner* — Nicholas J Lane
(74) *Attorney, Agent, or Firm* — Eugene J. A. Gierczak

(57) ABSTRACT

A brake stroke logging indicator for determining brake stroke condition on a vehicle braking system comprising a moveable logger within a housing which logger can be moved within the housing from an initial position to a moved position, by the pressure from a brake pushrod. After the pressure from the brake pushrod has been released however, the logger remains in position in the housing. As such, the logger indicates the distance of the longest brake stroke traveled since the system was reset, without the need of a second person, or brake pedal jamming device. The indicating logger will always indicate the longest stroke traveled, where the driver has no need to hold the brake pedal down for inspection. Moreover, when the vehicle is stopped the indicating logger will indicate other mechanical problems that normally can be detected only when the vehicle is in motion.

17 Claims, 8 Drawing Sheets

(56) References Cited

U.S. PATENT DOCUMENTS

| | | | | |
|---|---|---|---|---|
| 7,624,849 B2* | 12/2009 | Goncalves | ............ | F16D 66/00 188/1.11 R |
| 8,991,568 B2* | 3/2015 | Call | ................ | B61H 15/0007 188/202 |

* cited by examiner

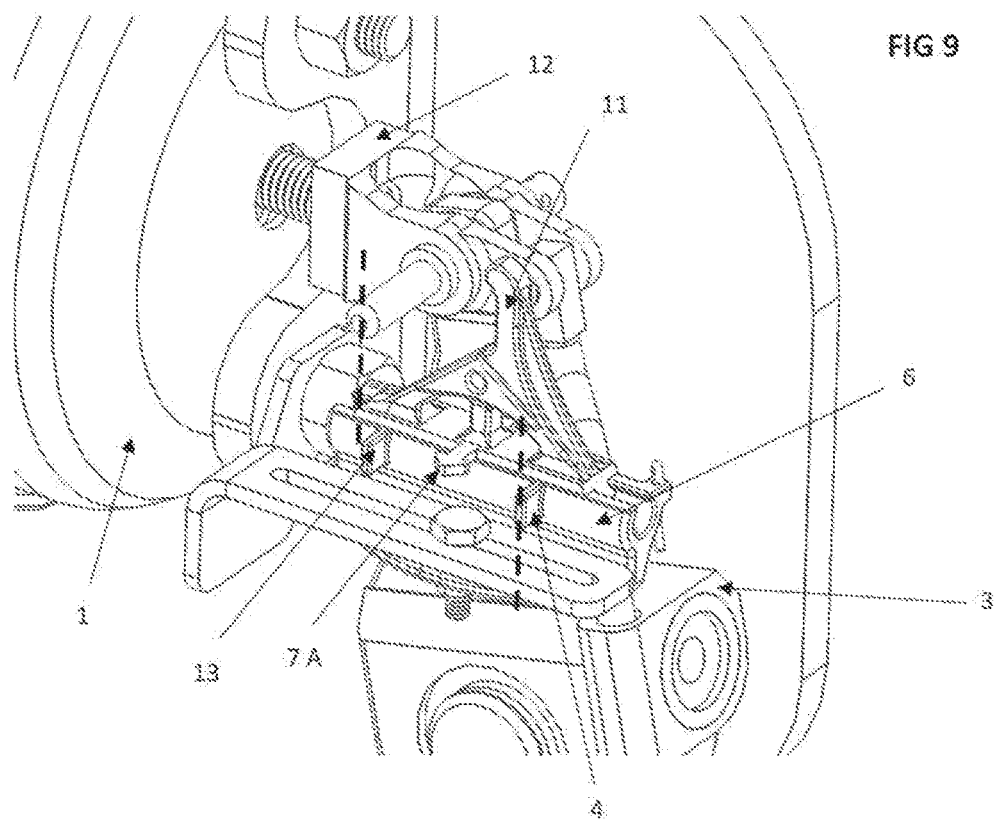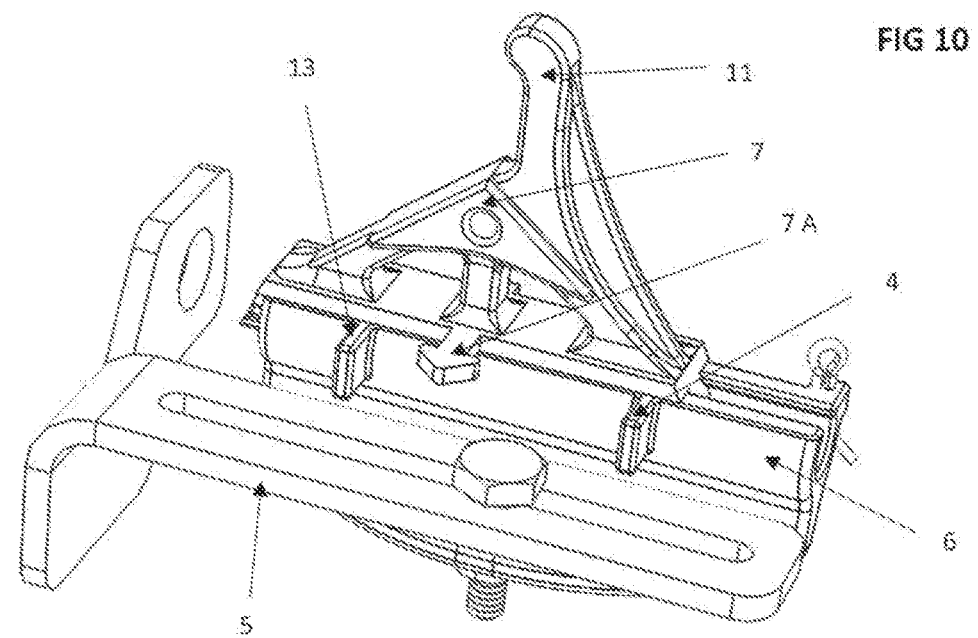

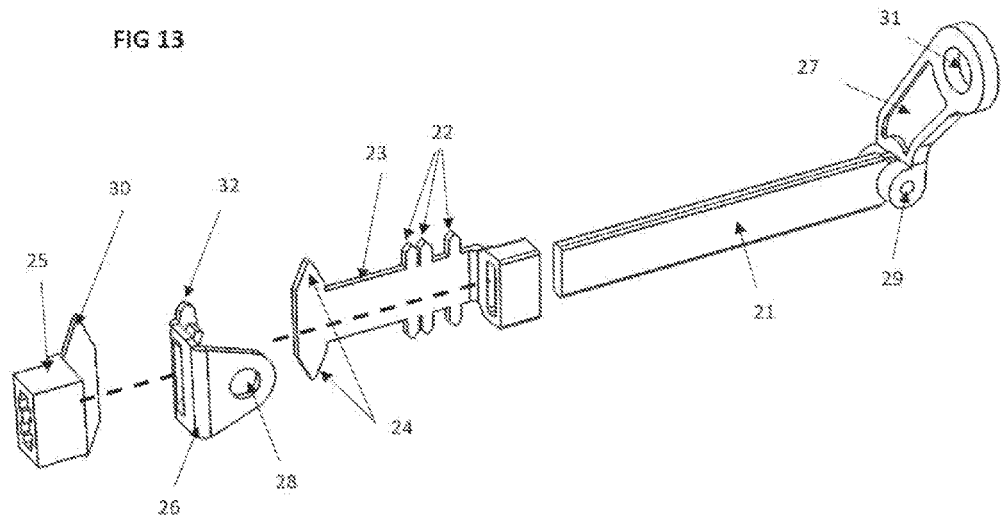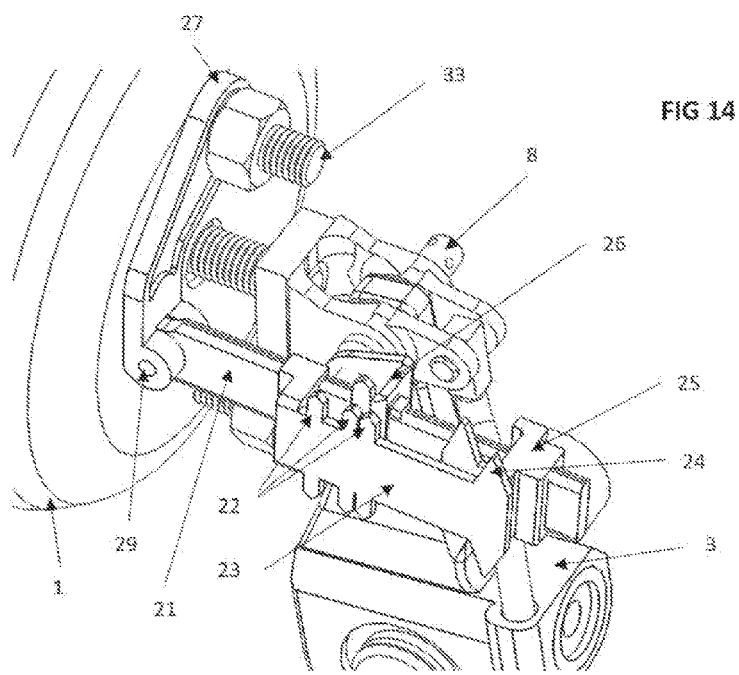

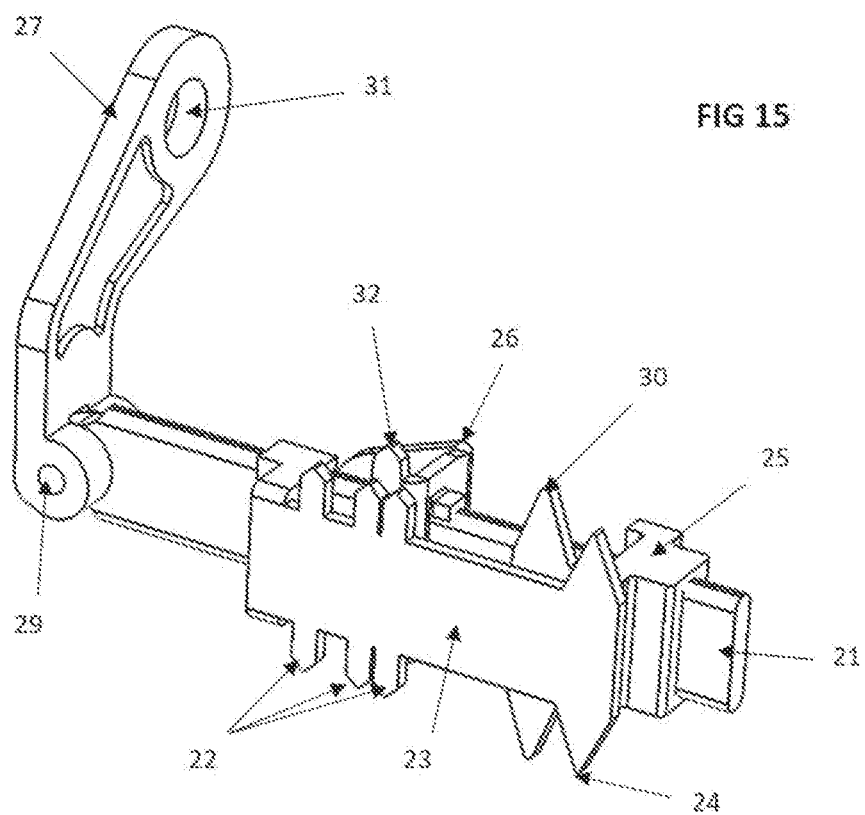

BRAKE STROKE LOGGING INDICATOR

FIELD OF THE INVENTION

This invention relates to a brake system stroke travel indication recording device, and in particular, to a visual brake stroke logging indicator for use on trucks, trailers, and the like. The system is of most use in vehicles have pneumatically operated braking systems.

BACKGROUND OF THE INVENTION

Pneumatically operated braking systems for trucks, trailers and the like, typically feature air pressure activated brake chambers, which are utilized to move movable brake system pushrods which typically extend perpendicularly outwards from the air pressure chambers. These system also typically include a slack adjuster lever and a clevis pin for pivoting and mounting the slack adjuster on a pushrod yoke. In use, when the brake pedal is depressed, air pressure moves the pushrod outwards, which moves the slack adjuster, in an arc travel configuration, and thus turning a cam which ultimately actuates the brakes.

Over time, as the brakes are repeatedly applied, the distance traveled by the pushrod may increase, by for example, wear or improper maintenance, and thus the system requires regular inspection of the push rod travel distance to ensure that the brakes are operating within pre-established parameters, and are operating in good working order. To emphasize the importance of checking the brake pushrod movement, regular inspection of the pushrod travel distance is often required by regulatory authorities, and thus, inspection can be mandatory.

There have been attempts to facilitate this mandatory brake stroke inspection with the use of inspection apparatuses that have a bracket and attached start point and travel end point indicators, fastened to the brake chamber or a component of the brake system.

By way of example of these types of devices, U.S. Pat. No. 4,279,214 issued Jul. 21, 1981, discloses a brake adjustment indicator which can be installed on a vehicle with pneumatic brakes. The indicator includes a sleeve that loosely fits over the push rod of a pneumatic actuator.

U.S. Pat. No. 4,776,438 issued Oct. 11, 1988, discloses a brake adjustment indicator which includes a mounting bracket having an elongated body with a slot that runs parallel to a rod that extends through an air brake chamber and connects at one end to the brake arm by a clevis pin.

U.S. Pat. No. 4,879,964 issued Nov. 14, 1989, discloses an air brake adjustment marker that includes an air supply, an air canister, and moveable members that include a push rod that extends from the air canister and has a first extended position and a second over-extended position. The adjustment marker includes a chain attached to the push rod, and an indicator flag that is activated when the push rod is in the over-extended position.

U.S. Pat. No. 5,244,061 issued Sep. 14, 1993, discloses an air brake stroke length gauge that operates in conjunction with an air brake system. The gauge comprises of a stroke length indicator that is mounted on the push rod, and a reference marker that is attached to the air brake system at a distance which corresponds to the appropriate stroke length for the brake system when properly adjusted.

U.S. Pat. No. 5,320,198 issued Jun. 14, 1994, discloses a indicator for indicating the setting and linear stroke movement of a brake rod of a brake assembly. The gauge includes reference indicators that are located on both the brake rod's clevis and on the arm of the brake's slack adjustment member, thereby indicating the brake rod travel and the need for brake adjustment.

U.S. Pat. No. 5,441,128 issued Aug. 15, 1995, discloses a bracket body that can be attached to a brake rod and to the clevis member of a conventional brake adjustment apparatus. The bracket body provides for an indirect measurement of the brake rod travel and adjustment.

U.S. Pat. No. 5,699,880, issued Dec. 23, 1997, discloses the use of a brake adjustment indicator including a mounting bracket, having an elongated body with a slot, and a spacer for receiving two bolts for indicating limit positions.

Finally, U.S. Pat. No. 5,913,385, issued Jun. 22, 1999, shows the use of a brake adjustment indicator having a clevis pin that provides a visual indication of brake pushrod travel during use, in relation to two indicator posts.

While useful, these apparatuses are somewhat limited in that they typically require pressure to be applied to the brakes each time an inspection is undertaken, so that the maximum travel of the pushrod can be directly observed. However, use of these devices by an operator will require either a brake pedal jamming device that can be wedged into place to apply pressure on the brake pedal, or requires a second person to hold the brake pedal down so that the pushrod stroke travel can be visually inspected. These approaches are not always convenient, and therefore, not always done on a regular basis.

Also, it can be noted that operators may attempt to use the parking brakes as a means of applying the brakes for inspection but this approach is not satisfactory since a parking brake application will typically use less force than a full brake application and thus may show a false reading of actual pushrod travel.

Moreover, a full inspection might require two sets of visual inspections, since it will also be necessary to observe the pushrod position when the brakes are not applied, in order to establish that the brake pushrod initial position (without the brakes being applied), is at an appropriate position, and therefore, will be conducive for the pushrods to move, and the brakes to operate, within normal expected tolerances.

To overcome these difficulties, it would be advantageous to provide an easily implemented approach to showing the maximum pushrod travel distance, without needing a second person's assistance, or in face, even applying the brakes during the inspection process. It would also be advantageous to be able to observe the initial brake pushrod position, as well as the maximum pushrod travel position, in a single inspection.

SUMMARY OF THE INVENTION

An exemplary implementation of a visual brake stroke logging indicator of the present invention preferably includes a moveable visual indicator, or logger, which moves, by preferably sliding within a slot, from a first, initial position, to a moved position, when the logger is pushed by a moving brake pushrod, after application of pressure on the pushrod, and wherein the logger remains in the moved position once pressure is removed from the brake pushrod. As a result, observation of the logger in the moved position, provides an visual indicator of the maximum distance traveled by the pushrod, since being reset to the initial position. The maximum distance traveled by the pushrod, as recorded by the moveable visual indicator, can then be compared to pre-established maximum limits for the pushrod to travel. A visual comparison of the pushrod travel limits can be established by providing visual indicators in the braking system, which are preferably by one or more attached visual limit indicators, and by comparing the logger position to the visual indicators. Through this approach, the operator can easily determine whether the pushrod travel is still within acceptable operating limitations.

Accordingly, it is a principal advantage of the present invention to provide an improved visual brake stroke logging indicator which provides a visual indication of the maximum travel of the pushrod, after the brakes have been applied.

It is a further advantage of the present invention to provide a visual brake stoke logging indicator which provides a visual indication of the maximum travel of the pushrod, and which can be easily reset to record the travel of one or more future brake pushrod travel events caused by applying the braking system.

It is a still further advantage of the present invention to provide a visual brake stroke logging indicator, or logger, which is mounted on a mounting bracket, and preferably a brake chamber mounting bracket, outside the brake chamber and includes a clevis assembly with a modified clevis pin. Preferably the modified clevis pin acts to the pushrod part that pushes the visual brake stroke logging indicator to its moved position.

The advantages set out hereinabove, as well as other objects and goals inherent thereto, are at least partially or fully provided by the visual brake stroke logging indicator device of the present invention, as set out herein below.

Accordingly, in one aspect, the present invention provides a visual brake stroke logging indicator comprising a moveable visual indicator, or logger, operatively connected to a vehicle braking system, which logger moves from a first, initial, brake-released position, to a moved brake-actuated position, by application of force from an attached brake pushrod, when the logger is pushed by the force of the pushrod, acting preferably on a logger pin arm on the logger, the logger is moved to said moved position, and wherein said logger is releasably held in said moved position, once the force from the brake pushrod has been removed. The logger is preferably held in a housing, and said logger is slidable, under pressure, in said housing.

Preferably, the logger comprises a moveable logger indicator, and stationary brake stroke limitation indicators, wherein said logger indicator can be compared to brake pushrod stroke limitation indicators in order to determine if the pushrod is operating within acceptable operating parameters.

In accordance with still another aspect of the invention, there is provided a visual brake stroke logging indicator which comprises of a bracket to which said stationary brake stroke limitation indicators are attached. In this respect, the housing for the logger includes a hole which allows it to also be bolted to said bracket.

In accordance with a further aspect of the invention, there is provided a visual brake stroke logging indicator which may be easily and rapidly installed on all types of pushrod and/or cam operated brake systems, and is relatively inexpensive but very durable. Further, in a preferred feature, the device of the present invention is adaptable to be retrofitted to existing visual brake stroke indicators of the prior art so as to provide a logging function as herein described, or which can be added to a braking system as a complete visual brake stroke indicator and logging device, on a variety of brake system.

As such it is clear that a main feature of the present invention, is to provide a visual brake stroke logging indicator, which provides an indication of the maximum brake stroke movement of a brake system pushrod since the logging indicator was last reset, and thus act to record, or log, the maximum travel of the pushrod for all prior brake applications, since the system was last reset. As a result of this approach, the maximum travel of the pushrod when the brakes have been applied, can be observed by an operator without the need of a second person to apply the brakes, and/or without the need for use of a brake pedal jamming device. Moreover, there is no longer a need to attempt to observe the pushrod movement distance by use of the parking brake system.

In this respect, it will be noted that the visual brake stroke logging indicator of the present invention, will always indicate the longest stroke traveled since the system was last reset, and thus, the driver has no need to hold the brake pedal down for inspection. This is achieved without the need to apply the brakes for this inspection.

Further, since the inspection can be conducted without activating the brakes for the test, the initial pushrod position can be inspected at the same time as the maximum pushrod travel distance. Thus, the total movement of the pushrod can evaluated in a single inspection.

Moreover, when the vehicle is stopped, the indicating logger of the present invention can also indicate other mechanical problems that might not normally be readily detected, such as, for example, failure of the brake pushrod to move, or to highlight a less than expected movement of the pushrod, when the brakes were applied.

DETAILED DESCRIPTION OF THE INVENTION

In the present application, the terms "logger", "indicator", or the phrase "logging indicator" refers to any devices used to provided an indication of the moved position of the brake activation pushrod. Moreover, it will be clear to the skilled artisan that while the present application is primarily directed to the use of pneumatically operated braking systems, the systems of the present invention can also be applied to hydraulic brake systems.

Further, the skilled artisan will be aware that brake stroke logging indicators of the type described herein can be used in a wide variety of applications. Accordingly, while the present application is described with particular reference to the trucking industry, industry, the skilled artisan would be aware that the present application is equally applicable in other non-trucking industries, such as the rail industry, or the like, or in other vehicles operating pneumatic braking systems, such as in bus or recreational vehicle applications.

BRIEF DESCRIPTION OF THE DRAWINGS

Embodiments of this invention will now be described by way of example only in association with the accompanying drawings in which:

FIG. 9 shows isometric view of the assembly installed where the logger housing includes attached indicators;

FIG. 10 shows a closer view of the assembly installed on the bracket where the logger housing has attached indicators;

FIG. 13 shows an exploded view of another embodiment of the device of the present invention where the mounting bracket comprises two pivoting parts and the clevis housing is inserted through the clevis pin to move it linearly, on a pivoting guide, wherein the brake stroke indicator is fastened to the pivoting guide and the logger pointer housing is moved along the pivoting guide;

FIG. 14 shows the FIG. 13 embodiment mounted onto the air brake chamber; and

FIG. 15 shows the assembled parts of the device shown in figure FIG. 13.

DETAILED DESCRIPTION OF THE PREFERRED EMBODIMENTS

Figure 1:
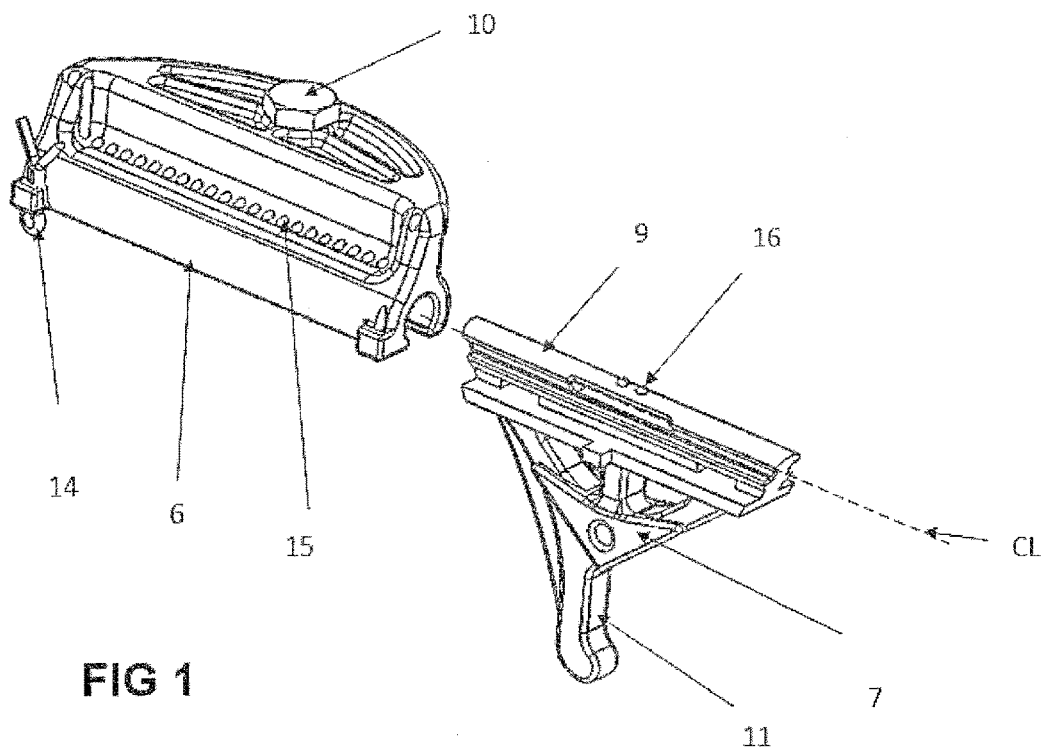
FIG. 1 shows an isometric view of a preferred embodiment of the visual brake stroke logging indicator of the present invention, and the logger housing.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Also, unless otherwise specifically noted, all of the features described herein may be combined with any of the above aspects, in any combination.

Further, it will be noted that operation of brake stroke indicators are well known within the industry. As such, the present invention will first be described with respect to the system described in U.S. Pat. No. 5,913,385, although it will be clear to the skilled artisan that the logging system of the present invention can be easily adapted for use with other visual brake stroke indicator devices of the prior art.

Figure 2:
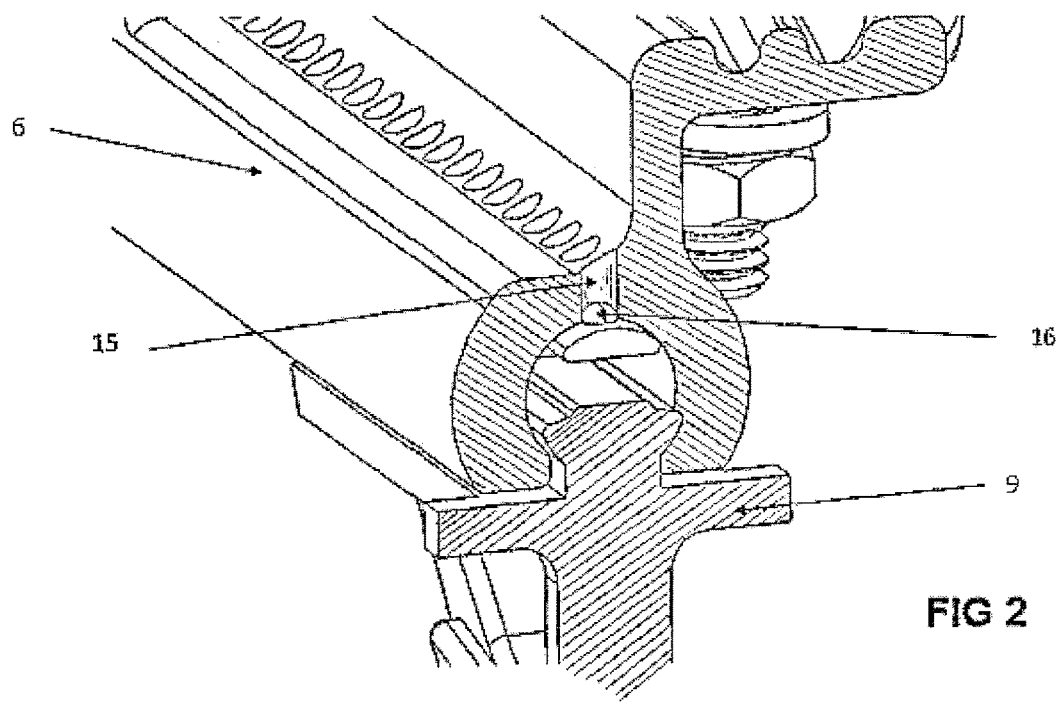
FIG. 2 shows section view of the reciprocating locking tab on the logger indicator and locking tab holes on the logger housing, where the reciprocating locking tab is hinged up and down to hold the logger indicator in position when the clevis pin is not pushing on it.

In reference to FIGS. 1 and 2 the logger housing 6 has a circular cutaway where the logger indicator 9 slides concentrically within the center line (CL), the clevis pin 8 (FIG. 3) is positioned behind the logger pin arm 11, thus pushing the logger pin arm 11 forward (FIG. 4), the indicating arrow 7 then displays the farthest position traveled by the clevis pin 8. The stop pin 14 is positioned to keep the logger indicator 9 from travelling off the logger housing 6.

The cross sectional view in FIG. 2, shows how the logger indicator 9 is held in position to the logger housing 6, where the reciprocating stepping tab 16, is a hinged part of the logger indicator 9. The reciprocating stepping tab 16 moves up and down to allow forward and backward linear movement of the logger indicator 9 and therefore locking into the locking tab holes 15 when force or movement is not applied.

Figure 3:
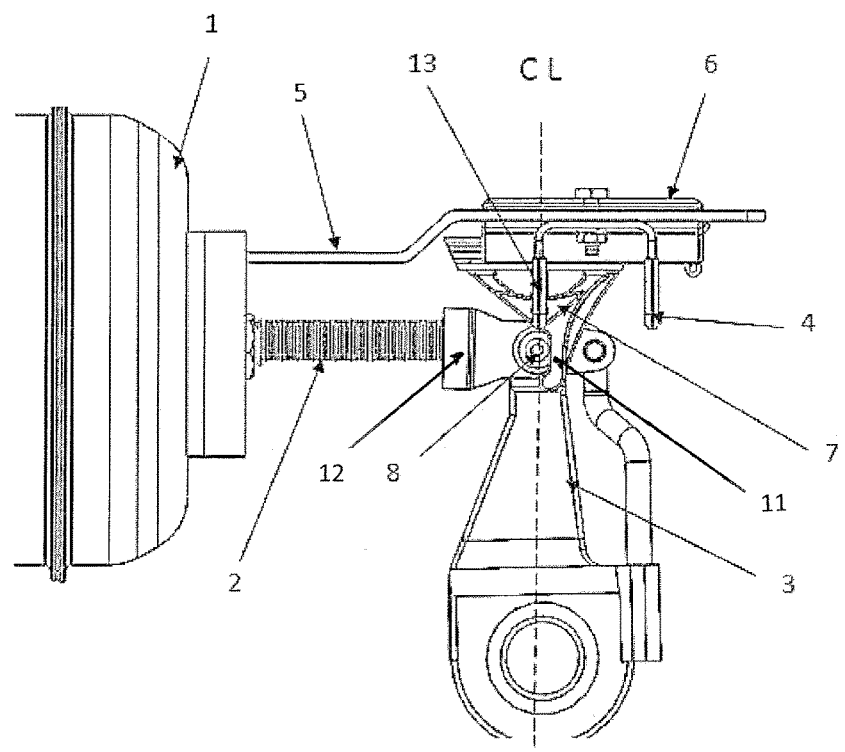
FIG. 3 shows side view of the assembly with brakes released where the clevis pin is in alignment with the release indicator, with the logger indicator at the same.

Referring to FIG. 3, the brakes are in their initial, release position, but it can be seen that the air chamber 1 will actuate push rod 2 fastened to a clevis yoke 12 that pivotally mates to the slack adjuster 3 by the clevis pin 8. The logger pin arm 11 is in front and tangent to the clevis pin 8 that is centered to the brakes released marker 13.

Figure 4:
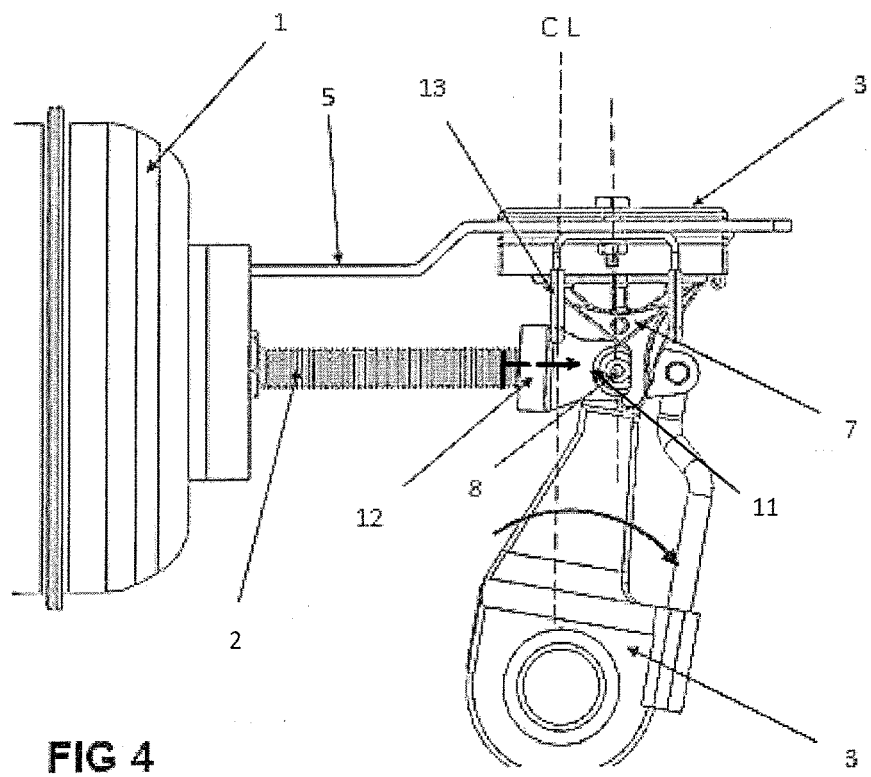
FIG. 4 shows side view of the same assembly positioned about half way into the stroke, and clevis pin indicator pushing the logger indicator forward.

In FIG. 4 the brakes have now been applied and the clevis pin 8 has moved forward pushing the logger pin arm 11 forward. The logger arrow 7 is in line with the clevis pin 8.

Figure 5:
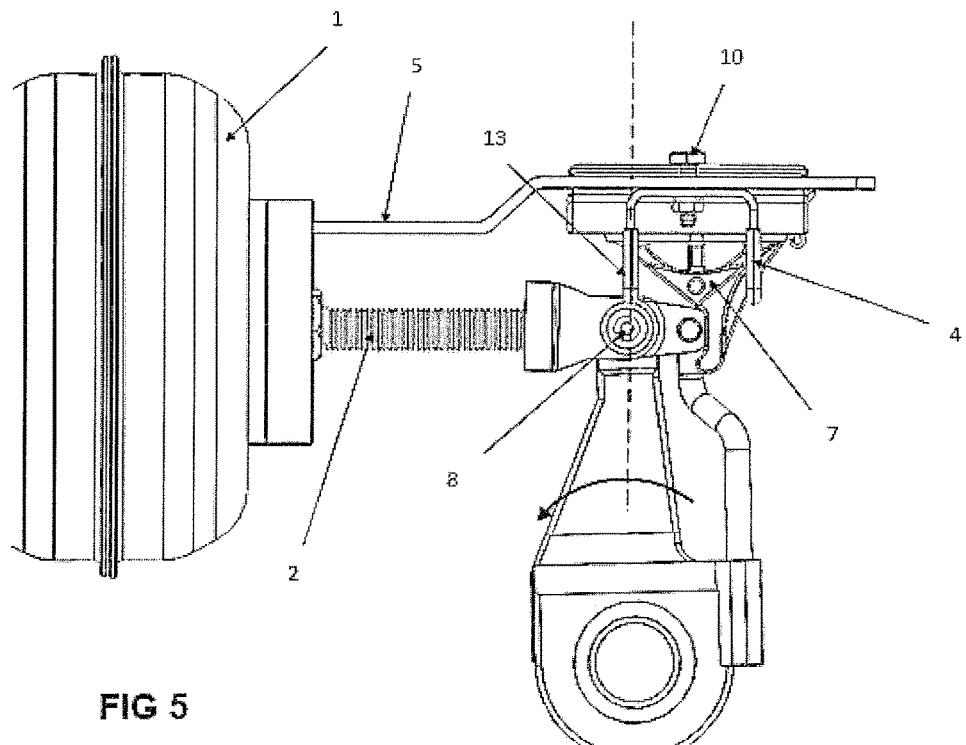
FIG. 5 shows side view of the same assembly in the brakes released position where the clevis pin is again in alignment with the release indicator, but the logger indicator remains in a position showing the longest applied stroke travel.

In FIG. 5 the brakes have been released, and are now again in their initial, released position where the clevis pin 8 is again in line with the brake released marker 13. At this point, however, indicating arrow 7 remains in its brake-actuated position, and therefore marks the distance of the last stroke traveled. When the brakes have been applied numerous times, logger arrow 7 shows the furthest movement of the logger indicator 9 within housing 6. When inspected, the operator preferably observes the system in this position, namely wherein the indicator at its initial position is within the lower tolerance position, and the indicating arrow of the pushrod stroke logging device is also within the pushrod's upper tolerance position, shown by maximum stroke limit indicator 4.

The lower and upper tolerance positions are marked by indicators 4 and 13 which preferably are two upright digits that are connected one to the other by a joining plate, and are mounted on a mounting bracket 5. As such, upright digits 4 and 13 have the ability to move in unison with one another. Housing 6 is also mounted on bracket 5, using bolt 10, which bolt 10 can also be used to hold indicators 4 and 13 in place.

Figure 6:
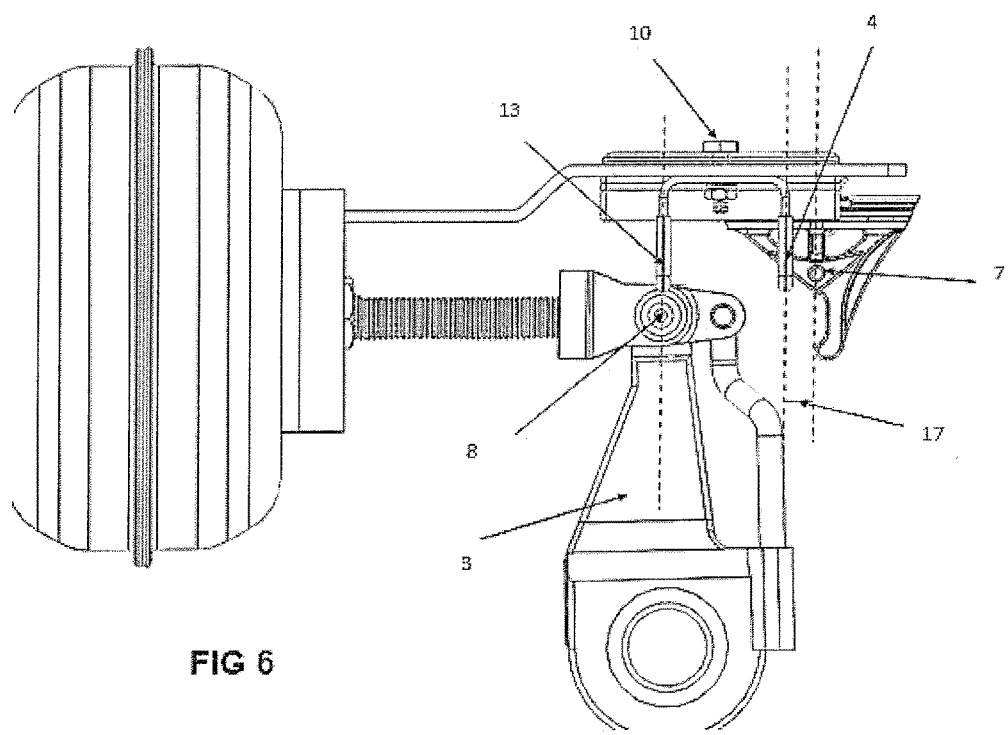
FIG. 6 shows side view of the assembly with brakes released where the clevis pin is in alignment with the release marker indicator, but the arrow indicator on the logger indicator is past the stroke limit indicator showing an out of adjustment brake stroke.

FIG. 6 shows brakes in release position with the clevis pin 8 aligned with the brake released marker 13. This particular position is a continuation of similar to that of FIG. 5, but in this case, the pushrod has exceeded the upper tolerance since the pushrod stroke traveled past the stroke limit indicator 4. This shows an out of adjustment value 17 for the maximum brake stroke position.

Figure 7:
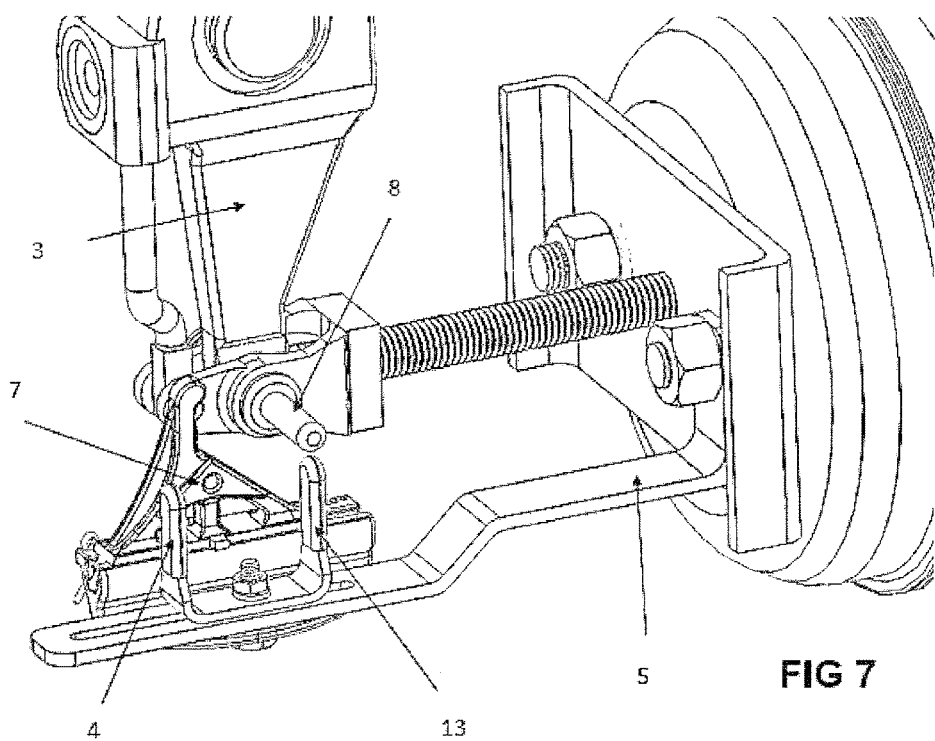
FIG. 7 shows an isometric view of the assembly installed in an upwards facing position, which orientation might be used to accommodate different chassis designs, obstacles and/or better line of sight.

FIG. 7 is an isometric view showing the whole brake assembly, with brakes released, arranged in an inverted orientation to accommodate different chassis designs, obstacles and provide a different visual indication.

Figure 8:
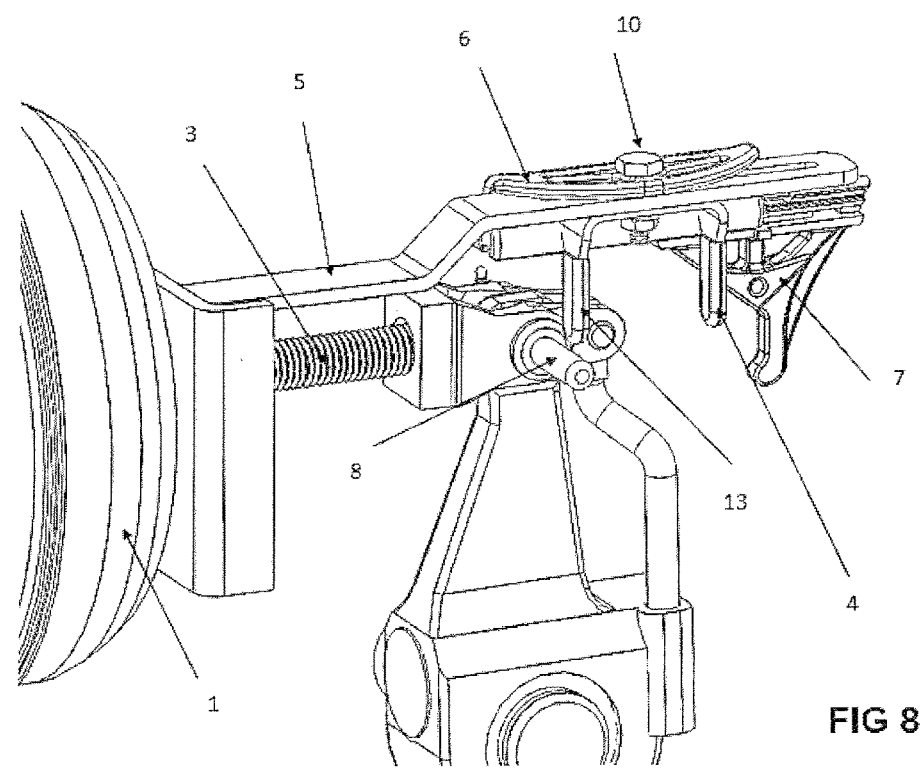
FIG. 8 shows isometric view of the assembly installed downward position with brakes released and the logger indicator showing an out of adjustment brake stroke.

FIG. 8 is an isometric view again showing the whole brake assembly, with the brakes in a released position, in still further orientation to that shown in FIG. 7. In this embodiment, the brake released marker 13 is in alignment with the clevis pin 8. Similar to FIG. 6, indicating arrow 7 is past the stroke limit indicator 4.

FIGS. 9 and 10 show yet another embodiment of the present invention wherein the initial brake released marker 13 and the stroke limit indicator 4 (FIG. 3 to FIG. 8) are shown on the logger housing 6 which thereby reduces the number of parts. The brake initial brake released marker 13 and the stroke limit indicator 4 are extruded as part of the logger housing 6. Also logger arrow 7 maybe be duplicated with a second extruded arrow logger 7a which provides increased visual indication.

Additionally, FIG. 10 shows a closer view on the extruded brake released marker 13 and the stroke limit indicator 4 with the logger arrows 7 and 7a showing a brake application.

Figure 11:
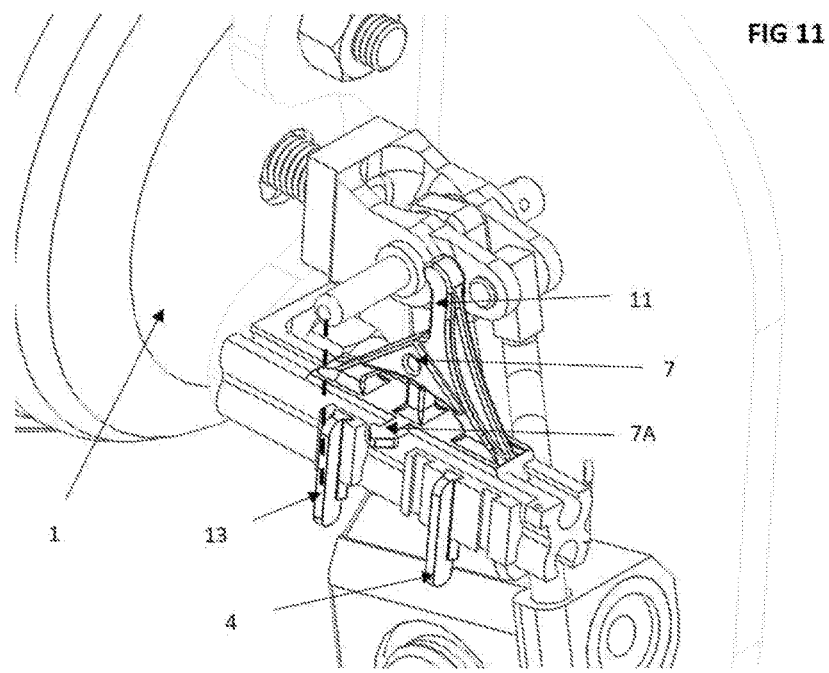
FIG. 11 shows another embodiment mounted to the air brake chamber where the logger indicator slides linearly on the bracket slot and uses cut slots on the side of the mounting bracket where the release markers and the stroke limit indicator are inserted.
Figure 12:
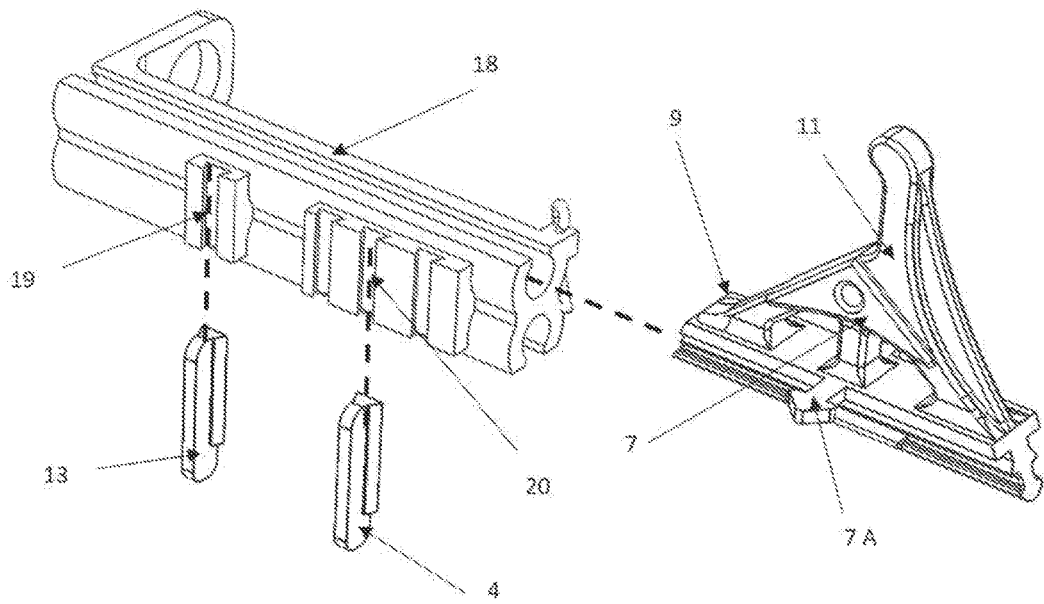
FIG. 12 shows an exploded view of FIG. 11.

FIGS. 11 and 12 show another embodiment using a logger housing bracket 18 fastened to a brake chamber 1. The logger indicator 9 slides concentrically with the center line within the logger housing bracket 18.

FIG. 12 provides a closer view of the apparatus showing the logger housing bracket 18 with a brake released marker slot 19 and multiple stroke limit indicator slots 20. The brake released marker 13 is inserted into the brake released marker slot 19 and the stroke limit indicator 4 may be inserted into selected stroke limit indicator slots 20. This allows the user to insert the limit indicators into appropriate slots to show the maximum travel for the particular braking system being used. Typically the distances from the brake released marker slot 19 and the selected indicator slots 20, will be between 1 and 2 inches, although other values might be provided, where needed.

FIGS. 13 to 15 show the features of another embodiment of the apparatus showing an exploded view of the assembly in FIG. 13, where the mounting bracket 27 is fastened to a brake chamber using a bracket mounting hole 31. The pivoting guide 21 is attached to the mounting bracket 27 by a pivoting pin 29 for vertical movement. The brake stroke indicator 23 slides onto the pivoting guide 21 and is fastened in place with a set screw or like fastener. The clevis housing 26 with the integrated logger pointer 32 slides onto the pivoting guide 21. The clevis pin 8 (see FIG. 14) is inserted into the clevis mounting hole 28 to linearly move the clevis housing 26 along the pivoting guide 21. The logger pointer housing 25 with the integrated logger pointer 30 slides linearly along the pivoting guide 21.

FIG. 14 shows the device assembled and mounted onto a brake chamber 1. The clevis indicator 32 may be aligned with one of the multiple brake released markers 22 and when the brakes are applied, the clevis housing 26 pushes on the logger pointer housing 25 where the logger pointer 30 shows the distance traveled relative to the stroke limit indicator 24.

FIG. 15 shows a closer view of the embodiment of FIG. 13 and FIG. 14 with its parts as an assembly.

It will be understood that the components of the various parts of the visual brake stroke logging indicator of the present invention can be manufactured of any suitable materials. Particularly preferred are plastic components that can be readily fabricated at low cost. Moreover, it is preferred that the indicator arrows, and limit indicators, and the like, be made of, or covered with brightly coloured materials to assist in observing their various positions. This is particularly preferred since the amount of dirt in the area of the brakes, can be significant, and can interfere with observing the various components.

Also, the visual brake stroke logging indicator device of the present invention should be manufactured with components that will not inadvertently interfere with the normal operation of the braking system. Plastic components are particularly preferred in this respect.

Thus, it is apparent that there has been provided, in accordance with the present invention, a visual brake stroke indicator which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A visual brake stroke logging indicator comprising a logger housing connected to a vehicle braking system at a selected position, said logger housing having an exterior surface and an interior surface and a plurality of aligned holes extending through a thickness of said logger housing from said interior surface to said exterior surface of said logger housing; a moveable logger operatively connected to said logger housing which moves from a first, initial, brake-released position, to a moved brake-actuated position, by application of force from an attached brake pushrod and is releasably held in said moved position, by at least one of said plurality of aligned holes once the force from said brake pushrod has been removed, and wherein said visual brake stroke logging indicator further comprises: (i) a moveable indicator which moves with said brake pushrod; and (ii) stationary brake stroke limitation indicators which remain stationary, whereby the positions of both said moveable indicator and said moveable logger can be compared to said stationary brake stroke limitation indicators in order to determine if the vehicle braking system is operating within acceptable operating parameters.

2. A visual brake stroke logging indicator as claimed in claim 1 wherein said moveable logger is received for slideable movement within said interior surface of said logger housing.

3. A visual brake stroke logging indicator as claimed in claim 2 wherein said logger housing includes a hole which allows it to be bolted to a bracket.

4. A visual brake stroke logging indicator as claimed in claim 3 wherein said stationary brake stroke limitation indicators are mounted on said bracket.

5. A visual brake stroke logging indicator as claimed in claim 4 wherein said stationary brake stroke limitation indicators are two upright digits that are attached to said bracket.

6. A visual brake stroke logging indicator as claimed in claim 5 wherein said upright digits have the ability to move in unison with one another.

7. A visual brake stroke logging indicator as claimed in claim 1 wherein said logging indicator is used on a pneumatically operated brake used in the trucking industry, or is used on a pneumatically operated brake used on a bus or a recreational vehicle.

8. A visual brake stroke logging indicator as claimed in claim 1 wherein said moveable logger is releasable held in said moved position by reciprocating stepping tabs disposed on said moveable logger operatively engaging at least one of said plurality of aligned holes.

9. A visual brake stroke logging indicator as claimed in claim 1 wherein said brake pushrod is attached to a logger pin arm on said visual brake stroke logging indicator which logger pin arm acts as said moveable indicator, and wherein said logger pin arm acts on said moveable logger so that said moveable logger is moved from said first position to said moved position by the force of said brake pushrod acting on said logger pin arm.

10. A visual brake stroke logging indicator comprising;
(a) a logger housing connected to a braking system, said logger housing having a cutaway and a plurality of aligned holes extending from said cutaway through a thickness of said logger housing;
(b) a moveable logger disposed in said cutaway for slidable movement relative to said brake stroke housing from a first initial brake-released position to a moved brake-actuated position by application of force from an attached brake pushrod, and held in said moved position by at least one protrusion extending from said moveable logger engaging with at least one said plurality of aligned holes;
(c) a moveable indicator carried by said moveable logger; and
(d) stationary brake stroke limitation indicators, whereby the positions of said moveable indicator can be compared to said stationary brake stroke limitation indicators.

11. A visual brake stroke logging indicator as claimed in claim 10 wherein said logger housing has an interior surface and an exterior surface, and said cutaway is presented by said interior surface.

12. A visual brake stroke logging indicator as claimed in claim 11 wherein said plurality of aligned holes extend from said interior surface to said exterior surface of said logger housing.

13. A visual brake stroke logging indicator as claimed in claim 12 wherein said cutaway presents a longitudinal axis from one end of said logger housing to another end of said logger housing and said plurality of aligned holes are substantially parallel to said longitudinal axis.

14. A visual brake stroke logging indicator as claimed in claim 13 wherein said logger housing has at least two slots, and wherein said stationary brake stroke limitation indicators comprises a first brake stroke limitation indicator engageable with one of said at least two slots, and a second brake stroke limitation indicator engageable with the other one of said at least two slots.

15. A visual brake stroke logging indicator comprising:
(a) a logger housing having an exterior surface and an interior surface, said interior surface having a circular cutaway defining a longitudinal axis, said logger housing connected to a vehicle braking system at a selected position;
(b) a plurality of aligned holes extending from said interior surface to said exterior surface of said logger housing;
(c) a moveable logger slidable within said cutaway to move from a first initial brake release position to a second moved brake-actuated position by an actuated brake push rod; said moveable logger presenting at least one reciprocating tab sequentially engaging one of said holes of said plurality of holes as said moveable logger moves from said first initial brake release position to said second moved brake actuated position; and
(d) stationary brake stroke limitation indicators, whereby the positions of said moveable logger can be compared with said stationary brake stroke limitation indicators.

16. A method of logging the movement of a visual brake stroke indicator between acceptable first and second positions comprising the steps:
(a) attaching a logger housing to a braking system having a brake push rod, said logger housing having an exterior surface and an interior surface, said interior surface having a cutaway wherein said logger housing includes a plurality of holes extending from the interior surface to said exterior surface;
(b) inserting a moveable logger within said cutaway wherein said moveable logger has at least one reciprocating stepping tab and a brake stroke indicator, and
(c) moving the moveable logger by said brake push rod relative the logger housing between said first and second positions and moving said brake stroke indicator and moving said at least one reciprocating stepping tab sequentially along said plurality of holes to releasably hold the moveable logger when the push rod has been released to visually indicate the position of the moveable logger between said first and second positions.

17. A visual brake stroke logging indicator as claimed in claim 10, wherein said at least one protrusion comprises at least one reciprocating stepping tab.

* * * * *